July 25, 1933.  J. T. H. DEMPSTER  1,919,978
WELDING APPARATUS
Filed Sept. 24, 1931
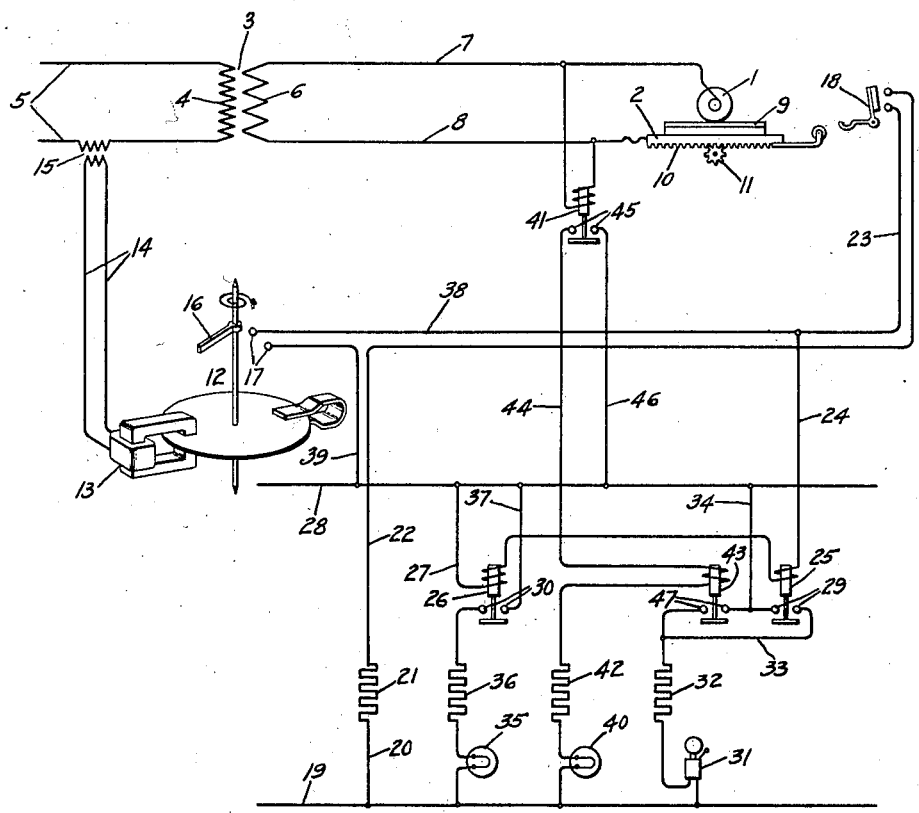
Inventor:
John T. H. Dempster.
by Charles A. Mullar
His Attorney.

Patented July 25, 1933

1,919,978

UNITED STATES PATENT OFFICE

JOHN T. H. DEMPSTER, OF SCHENECTADY, NEW YORK, ASSIGNOR TO GENERAL ELECTRIC COMPANY, A CORPORATION OF NEW YORK

WELDING APPARATUS

Application filed September 24, 1931. Serial No. 564,847.

My invention relates to welding, and more particularly to means for indicating the condition of welds produced by resistance line welding machines.

It is an object of my invention to provide means for indicating the presence of spots of insufficient fusion as well as burned spots in welds produced by resistance line welding machines.

Further objects of my invention will become apparent from a consideration of the following description of one embodiment thereof which is diagrammatically illustrated in the accompanying drawing.

The welding apparatus illustrated in this drawing comprises welding electrodes 1 and 2, and a source of welding current connected thereto through a transformer 3 whose primary 4 is connected to a source of supply 5 and whose secondary 6 is connected to the welding electrodes through conductors 7 and 8. The work 9, comprising two sheets of material to be welded together by means of a line weld, is supported on the electrode 2 which in the present embodiment assumes the form of a table provided with a rack gear 10 by means of which it is moved relatively to the electrode 1 through the agency of a traversing mechanism including a spur gear 11 which meshes with the rack 10.

In welding, the work parts are pressed between the electrodes 1 and 2 and sufficient current is passed through these electrodes and the work between them to produce enough heat to fuse the parts together and thus produce a weld. If the material of the work parts is uniform there is little variation in the current which flows at any part of the welding stroke and, since the stroke is always the same for a given welding operation and made at the same speed, a good weld will be produced if more than a certain number of ampere seconds are consumed in making the weld, provided, however, that the weld has not been burned during the welding operation.

According to the present invention a current time element relay in conjunction with a limit switch and a relay responsive to the voltage across the welding electrodes is used to indicate a defective weld due either to insufficient fusion or to burned spots.

In the drawing the current time element relay is diagrammatically shown at 12. Any suitable form of time element device may be used, but I prefer to use a relay of the construction illustrated and described in U. S. Patent No. 1,539,812 to C. I. Hall, granted May 26, 1925, and assigned to the same asignee as the present case. This relay has a characteristic such that time and current are inversely related to each other as regards the amount of either required to operate the relay. The current element 13 of this relay is connected through conductors 14 to a current transformer 15 inserted in one of the leads to the primary 4 of the welding transformer. Any other suitable connection may be employed by reason of which the current time element device 12 is rendered responsive to the welding current. In the particular arrangement illustrated the relay contacts 16 and 17 are biased to open position, and the adjustment is such that these contacts are closed only after the minimum value of current required for a good weld has flowed for the time required for making a full welding stroke.

On the completion of each welding stroke the following circuit is completed through the contacts of a limit switch 18 operated by the above-described traversing means:—From control bus 19 through conductor 20, resistance 21, conductor 22, switch 18, conductors 23 and 24, the operating coils of switches 25 and 26 and conductor 27 to control bus 28. Each time this circuit is closed switches 25 and 26 will close their contacts 29 and 30 thereby completing the operating circuits of visual and audible alarms, by means of which the welding operator is warned that a defective weld has just been produced. Switch 25 completes a circuit from control bus 19 through a bell 31, resistance 32, conductor 33, contacts 29 and conductor 34 to bus 28. Switch 26 completes a circuit through an indicating lamp 35, resistance 36, contacts 30 and conductor 37 to bus 28. The operation of switches 25 and 26 will be prevented, however, if during the welding operation and prior to the closing of the above referred to limit switch the contacts 16 and 17 of the current time element relay 12 have also closed. The closing of these contacts establishes a shunt circuit about the operating coils of switches 25 and 26 through conductors 38 and 39. When switch 18 and the contacts 16 and 17 of the current time element relay 12 are both closed the circuit from bus 19 to bus 28 is as follows:— Through conductor 20, resistance 21, conductor 22, switch 18, conductors 23 and 38, contacts 16 and 17 and conductor 39. When this circuit is completed neither the bell 31 nor the lamp 35 will be operated, and the welder is thereby informed that the welding current necessary for producing a sound weld has been obtained during the welding stroke first completed.

In addition to the signals 31 and 35 an additional signal 40 is provided. This may also be a lamp which may have a distinctive color from that of lamp 35. For example, lamp 35 may be a red lamp, and lamp 40 a green lamp. Lamp 40 is connected across the busses 19 and 28 by means of a relay 41 whose operating coil is connected across the electrodes 1 and 2. The contacts of this relay are normally open and are closed only when the welding voltage goes above its normal full load value. When this relay operates it completes a circuit from bus 19 through lamp 40, resistance 42, the operating coil of switch 43, conductor 44, contacts 45 of relay 41, and conductor 46 to bus 28. When switch 43 closes, due to the flow of current through its operating coil, the operating circuit through bell 31 previously traced is completed through contacts 47 of switch 43. Thus, if at any time during the welding stroke, the welding voltage goes above the normal full load welding voltage lamp 40 lights and bell 31 rings.

The operation of the relay 41 and the lighting of lamp 40 may show two things. If at the end of the welding stroke lamp 35 is also lighted the lighting of lamp 40 indicates the point at which the weld did not fuse. The operation of relay 41 in such case resulted from the welding current decreasing sufficiently to permit the voltage of the transformer to rise to the calibrated value of the relay, and the lighting of lamp 35 was due to the failure of the minimum flow of current for the time required for a good weld. When, however, the lighting of lamp 40 is not followed by the lighting of lamp 35 at the completion of the welding stroke the diagnosis is a badly burned weld. The theory of this operation is a high resistance contact which causes excess heat to be generated over a small area but does not cause enough decrease in ampere seconds to cause lamp 35 to be lighted.

In the system above described both visible and audible signals are given, the discriminating signal being a visual signal and the audible signal serving simply to attract the operator's attention. Various other signal arrangements are possible without departing from my invention, and the control circuits may be variously adapted to the signal devices employed. Depending upon the nature of the signal devices, the protective resistances 36, 42 and 32 may not be found necessary. The resistance 21, however, in the particular embodiment illustrated is necessary to prevent short circuiting of the control busses 19 and 28 through limit switch 18 and contacts 16 and 17 of the current time element relay 12. Although the particular time element relay shown in the drawing is provided with normally open contacts, current time element relays with normally closed contacts may be employed in a suitably modified control system without departing from my invention. These and other obvious modifications will occur to those skilled in the art.

My invention is not limited to alternating current systems such as illustrated but is equally applicable to direct current systems. Thus, while I have shown and described a particular embodiment of my invention, such modifications and variations are contemplated as fall within the scope of my invention as set forth in the appended claims.

What I claim as new and desire to secure by Letters Patent of the United States is:

1. Welding apparatus comprising means for producing a line weld, and means responsive to over voltage and the consumption of insufficient ampere seconds in producing the weld for indicating spots of insufficient fusion in said weld.

2. Welding apparatus comprising means for producing a line weld, and means responsive to over voltage and the consumption of excessive ampere seconds in producing the weld for indicating burned spots in said weld.

3. Welding apparatus comprising means for producing a line weld, and means responsive to the ampere seconds consumed in making the weld for indicating at the end of the welding operation the constancy of the welding current during said welding operation.

4. Welding apparatus comprising means for producing a line weld, means for indicating at the end of the welding operation the constancy of the welding current during said operation, means for indicating burned spots in said weld, and means for indicating spots of insufficient fusion in said weld.

5. Welding apparatus comprising means for producing a line weld, a signal device, means responsive to the welding current and the time of making said weld, and means for establishing an operative connection between said last-mentioned means and said signal device at the end of the welding operation.

6. Welding apparatus comprising welding electrodes, a source of welding current, traversing means for producing a line weld in work inserted between said electrodes, a limit switch operated by said traversing means, a signal device, means including a relay for operating said signal device, means for completing an operating circuit through said relay and said limit switch, and means including a current time element relay responsive to the welding current and the time of making a welding stroke for controlling the operativeness of said circuit.

7. Welding apparatus comprising welding electrodes, a source of welding current, traversing means for producing a line weld in work inserted between said electrodes, a limit switch operated by said traversing means, a current time element relay responsive to the welding current and to the time of making a welding stroke, a signal device, and means for operating said signal device controlled by said limit switch and said current time element relay.

8. Line welding apparatus comprising welding electrodes, a source of welding current, a current time element relay responsive to the welding current and the time of making the welding stroke, a voltage relay responsive to the voltage across said welding electrodes, and a signal device operated by said relays.

9. Welding apparatus comprising welding electrodes, a source of welding current, traversing means for producing a line weld in work inserted between said electrodes, a limit switch operated by said traversing means, a current time element relay responsive to the welding current and the time of making a welding stroke with said traversing means, a signal device, means for operating said signal device controlled by said limit switch and said current time element relay, a second signal device, and means responsive to the voltage across said welding electrodes for operating said second signal device.

JOHN T. H. DEMPSTER.